United States Patent
Wong et al.

(10) Patent No.: US 8,943,555 B2
(45) Date of Patent: Jan. 27, 2015

(54) ASSET STREAMING

(75) Inventors: Raymond Wong, Cupertino, CA (US); Erik Torres Bergman, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/489,302

(22) Filed: Jun. 5, 2012

(65) Prior Publication Data

US 2013/0145430 A1    Jun. 6, 2013

Related U.S. Application Data

(60) Provisional application No. 61/493,491, filed on Jun. 5, 2011.

(51) Int. Cl.
| G06F 17/00 | (2006.01) |
| H04L 29/06 | (2006.01) |
| H04W 4/00 | (2009.01) |
| H04L 29/08 | (2006.01) |

(52) U.S. Cl.
CPC .............. *H04L 63/08* (2013.01); *H04L 63/108* (2013.01); *H04W 4/003* (2013.01); *H04L 67/36* (2013.01); *H04L 67/2804* (2013.01)
USPC ...... 726/4; 726/7; 725/25; 725/109; 455/466; 709/200; 709/203; 713/190

(58) Field of Classification Search
USPC .................... 726/4, 7; 455/466; 725/25, 109; 709/200, 203; 713/190
See application file for complete search history.

(56) References Cited

U.S. PATENT DOCUMENTS

| 7,996,882 | B2 | 8/2011 | L'Heureux et al. |
| 2003/0009527 | A1 | 1/2003 | McIntyre et al. |
| 2006/0087987 | A1* | 4/2006 | Witt et al. .................... 370/260 |
| 2006/0253526 | A1* | 11/2006 | Welch et al. .................. 709/200 |
| 2007/0094272 | A1* | 4/2007 | Yeh ................... 707/10 |
| 2007/0261095 | A1 | 11/2007 | Petrisor et al. |
| 2007/0276838 | A1* | 11/2007 | Abushanab et al. ........... 707/10 |
| 2009/0265747 | A1* | 10/2009 | Li ................ 725/109 |
| 2009/0318164 | A1* | 12/2009 | Kee ............. 455/456.1 |
| 2010/0017865 | A1* | 1/2010 | Leahy et al. ........ 726/7 |
| 2010/0113072 | A1* | 5/2010 | Gibson et al. ................ 455/466 |
| 2010/0268877 | A1* | 10/2010 | Resch et al. .................. 711/114 |
| 2011/0022642 | A1* | 1/2011 | deMilo et al. ................. 707/805 |
| 2011/0055862 | A1* | 3/2011 | Harp et al. ...................... 725/25 |
| 2011/0216640 | A1* | 9/2011 | Curtis .......................... 369/100 |
| 2011/0258461 | A1* | 10/2011 | Bates ........................... 713/190 |
| 2012/0084261 | A1* | 4/2012 | Parab ........................... 707/654 |
| 2012/0203809 | A1* | 8/2012 | Kim et al. ..................... 707/827 |
| 2012/0290643 | A1* | 11/2012 | Fok Ah Chuen et al. ..... 709/203 |
| 2013/0060857 | A1* | 3/2013 | Bezos .......................... 709/204 |

* cited by examiner

*Primary Examiner* — Beemnet Dada
*Assistant Examiner* — Sayed Beheshti Shirazi
(74) *Attorney, Agent, or Firm* — Blakely, Sokoloff, Taylor & Zafman LLP

(57) ABSTRACT

A device streams assets to network-based storage in cooperation with servers administering the network-based storage. The servers manage and secure access to the stream of assets, on both an account level and an asset level, in accordance with asset metadata registered for the assets during streaming, and in accordance with account data associated with the assets being streamed and the device with which the assets are streamed. The servers operate to notify other authorized devices associated with the device that the assets are available to download, including initiating the download of assets automatically or in response to user input.

15 Claims, 17 Drawing Sheets

PHOTO STREAM ON

PHOTO STREAM ALBUM

PHOTO STREAM WITH "LAST UPDATED"
FOOTER

WARNING WHEN TURNING OFF PHOTO STREAM

ASSET STREAMING

CROSS-REFERENCE TO RELATED APPLICATION

This application claims the benefit of an earlier filed provisional application, Application Ser. No. 61/493,491 filed on Jun. 5, 2011, entitled ASSET STREAMING, and is related to application Ser. No. 13/225,533 filed on Sep. 5, 2011, also entitled ASSET STREAMING.

TECHNICAL FIELD

The technical field relates generally to the distribution of electronic content.

SUMMARY OF THE DESCRIPTION

Methods, machine readable tangible storage media, and data processing systems that enable distribution of content across devices are described. In the description that follows, a data processing system or mobile computing device are collectively referred to as a device, and content for the device, which may be a digital photograph, video or other type of media file, data file, or other type of electronic content, is referred to as an asset.

In one embodiment, a device having an account permitting access to network-based storage, also termed cloud storage, streams assets to the network-based storage, and servers administering the network-based storage operate to notify other authorized devices that the assets are available to download, including initiating the download of assets automatically or in response to user input. Servers administering the network-based storage of assets further control the streaming of assets from and to devices, including securing access to the stream of assets, on both an account level and an asset level.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for enabling distribution of content across devices are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, devices generate assets that may be streamed, including capturing photos or videos with image capturing features on a mobile communications device, such as a cell phone, or other type of computing device, including an iOS® device, an iPhone® or iPad® device from Apple Inc.

In one embodiment, the assets can be purchased from vendor stores in the cloud. For example, purchased assets, such as songs, movies, and/or applications etc., can be downloaded from iTunes® stores in the cloud.

In one embodiment, network-based storage may be available for streaming assets to and from a device. For example, network-based storage may be offered in the cloud (or cloud storages, cloud services) via third party vendors such as Amazon's Simple Storage Service (S3), Microsoft, etc., to user devices such as an iOS® device, an iPhone® or iPad® device from Apple Inc.

Figure 1:
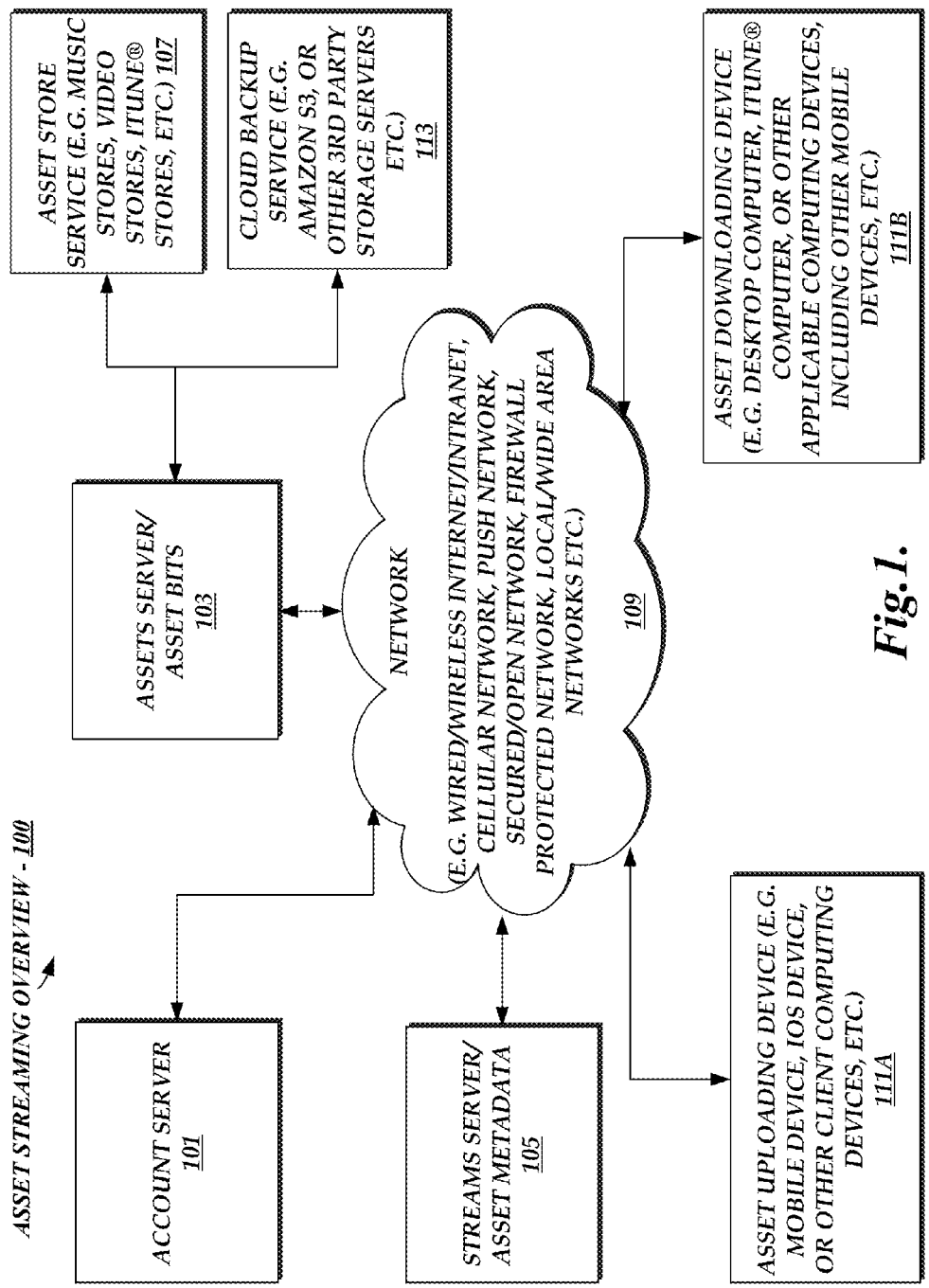
FIG. 1 is a block diagram overview illustrating one embodiment of network systems for asset streaming.

FIG. 1 is a block diagram overview illustrating one embodiment of network systems for asset streaming according to one embodiment described herein. Networked systems for asset streaming 100 may include dynamically configured networks 109 connecting servers 101, 103,105, 107 and 113 and streaming-enabled devices 111A and 111B. For example, an asset uploading device 111A, such as a phone device, may be sporadically connected with an assets server, such as that provided by the iCloud® service of Apple Inc., depending on where device 111A is located. Device 111A may intermittently be locally coupled or directly connected (e.g. via a wire) to another device 111B, or an asset downloading device, which, for example, can be another mobile computing device or, more typically, a stationary device, such as a desktop computer capable of accessing mass storage devices, such as hard disks, solid state devices, flash memories or other storage services.

In one embodiment, device 111A captures or otherwise generates assets that may be streamed via network 109 to multiple recipients (e.g. servers, asset stores, storage services) 101, 103, 105, 107, 113 generally referred to as cloud storage or the cloud, and subsequently to other recipient devices 111B. The recipients may be identified on the fly, and in some cases the recipients that are identified vary depending on the current location of the device 111A from which the assets originated.

In one embodiment, an account server 101, such as the account server of the iCloud® service offered by Apple Inc., maintains an account for the device 111A that identifies, among other information, whether the device 111A and other devices 111B associated with the account are eligible to participate in asset streaming, including identifying whether other devices 111B not normally associated with the account are currently following assets streamed by the device 111A.

In one embodiment, a streams server 105, also referred to as a metadata server maintains information in the form of metadata about assets that are eligible for streaming. The streams server 105 operates in conjunction with the account server 101 to filter those assets that are eligible for streaming based on the asset metadata, account and other information associated with the devices 111 to and from which assets are streamed. The metadata may include information about assets that describe the assets as well as metadata for filtering which assets can be streamed or downloaded from the network-based storage service to other devices associated with the device, including a size of the asset, an image resolution of the asset when the asset is an image, a date of the acquired asset, and security information restricting access to the acquired asset, such as restricting access to certain other accounts or devices. The metadata may be maintained by the streams server in certain states, such as a pending state or an active state, depending on the current state of the streamed asset, for example whether the asset has been successfully stored or is still eligible for streaming as will be described in further detail.

In one embodiment, an assets server 103, such as an assets server provided by the iCloud® service of Apple, Inc., maintains the assets themselves in conjunction with various storage services, such as the aforementioned asset store 107 and third party cloud backup service 113. The assets can be broken into chunks of actual data (e.g. of certain size of asset bits) for cloud service(s) to store. The streamed asset may be created, updated, deleted, disabled or operated on as requested. For example, assets no longer being streamed due to time limits or discontinuation of the streaming service associated with the account may be deleted.

Figure 2:
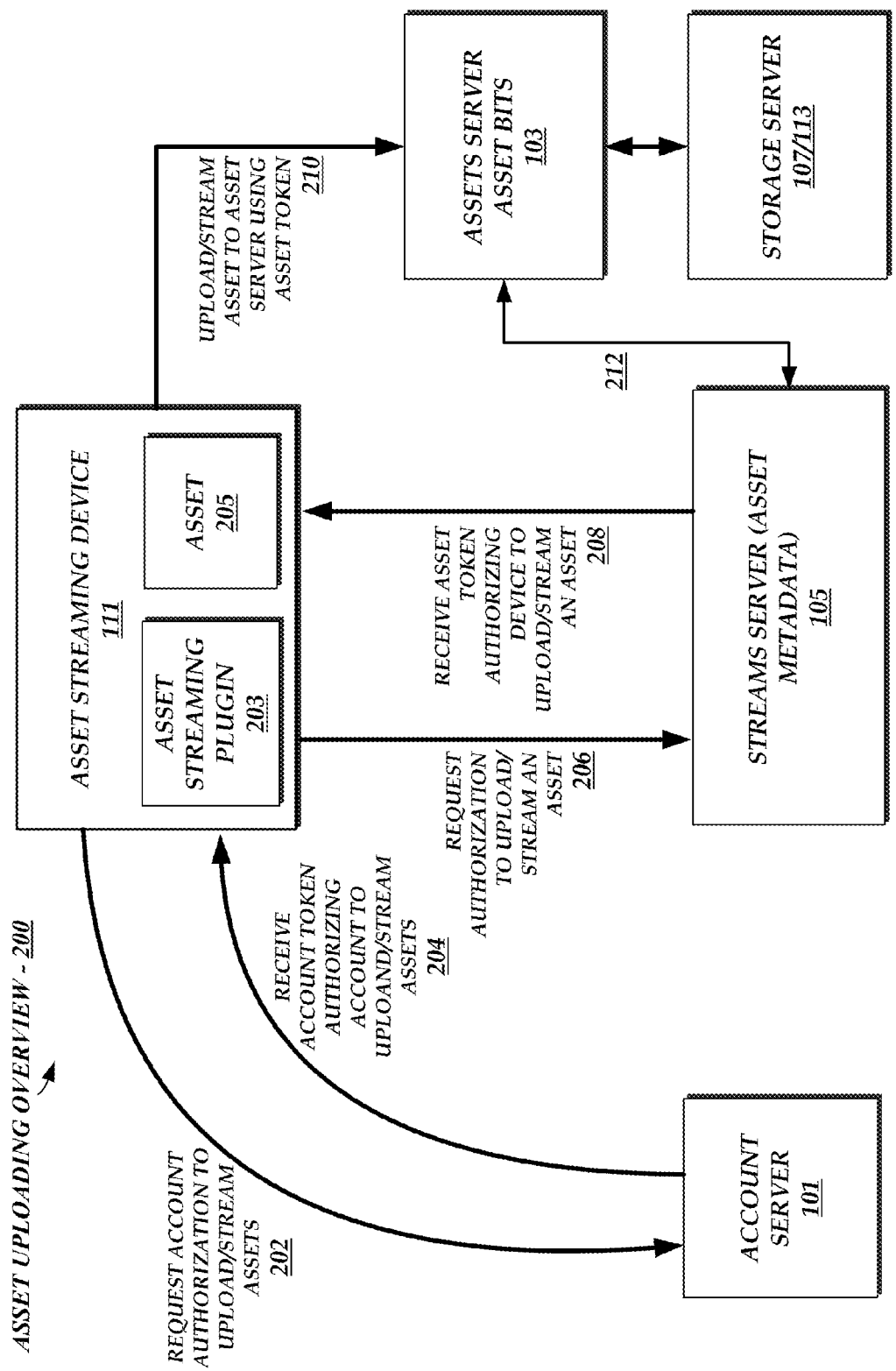
FIG. 2 is a block diagram overview illustrating an exemplary system for asset uploading in accordance with one embodiment of network systems for asset streaming.

FIG. 2 is a block diagram overview illustrating an exemplary system for asset uploading 200 in accordance with one embodiment of network systems for asset streaming 100. In operation, the asset streaming device 111 is configured with an asset streaming plug-in 203 containing the logic/instructions for carrying out operations for asset streaming 100, and stores an asset 205, or an asset derivative, such as a version of the asset in a different resolution or format (e.g., a different resolution image or a differently formatted image).

In one embodiment, the asset streaming device 111 sends an account authorization request 202 to account server 101 for account authorization to upload/stream assets, such as asset 205. The account server 101 evaluates the account authorization request 202 and, if appropriate, authorizes the device 111 to stream assets for this account. In one embodiment, the account server 101 generates and sends to the device 111 an account authorization token 204, and the device 111 receives the account token 204.

In a typical embodiment, the account token 204 expires after a limited amount of time, such as within two to four hours. Thus, the receiving device 111 must use the token 204 within that time period in order to successfully stream an asset, whether it is attempting to upload or download an asset.

In one embodiment, upon receiving the account token 204, the device 111 then sends an asset upload authorization request 206 to the streams server 105 to request permission to stream a particular asset, such as the asset 205. The streams server 105 evaluates the asset upload authorization request 206 and, if appropriate, authorizes the device 111 to upload the asset 205 to network-based cloud storage, for example via network 109 and assets server 103 to asset store 107 and/or a third party storage server 113.

For example, in one embodiment, to upload the asset 205 to network-based cloud storage, the streams server 105 registers the metadata describing the asset 205 and sets the status of the asset 205 to "pending," until the asset 205 is actually uploaded. Upon successfully registration, the streams server 105 generates and sends to the device 111 an asset authorization token 208, and the device 111 receives the asset token 208. Upon receiving the asset token 208 the device 111 then uploads the asset 205 to an assets server 103, which in turn stores the asset 205 on a storage server 107/113 or the like, in accordance with an asset storage algorithm. Subsequently, the streams server 105 in communication 212 with the assets server 103 and/or storage server 107/113 confirms whether the asset 205 was successfully uploaded and updates the metadata status accordingly. For example, the metadata status may be updated from pending, which indicates that the metadata has been registered, to active, which indicates that the asset 205 described by the metadata has been successfully uploaded.

In a typical embodiment, as with the account token 205, the asset token 208 expires after a limited amount of time, such as within two to four hours. Thus, the receiving device 111 must redeem the asset token 208 within that time period in order to successfully stream an asset, whether it is attempting to upload or download an asset. For example, the device 111 must send an asset request (for uploading or downloading, as the case may be) to the asset server 103 within the limited amount of time; otherwise, the request will be denied, and the device will have to be re-authenticated with the account server and/or the streams server, and receive new tokens.

In one embodiment, the account server 101 has a known address and can point any transactions generated to upload the asset 205 using different streams servers 105 and assets servers 103 in remote locations. For example, the remote locations of the streams servers 105 and assets servers 103 to use may be relayed to the devices 111A/111B via the asset token 208. In a typical embodiment, the remote locations may be determined based on a proximity of the devices 111A/111B to the streams servers 105 and assets servers 103.

Figure 3:
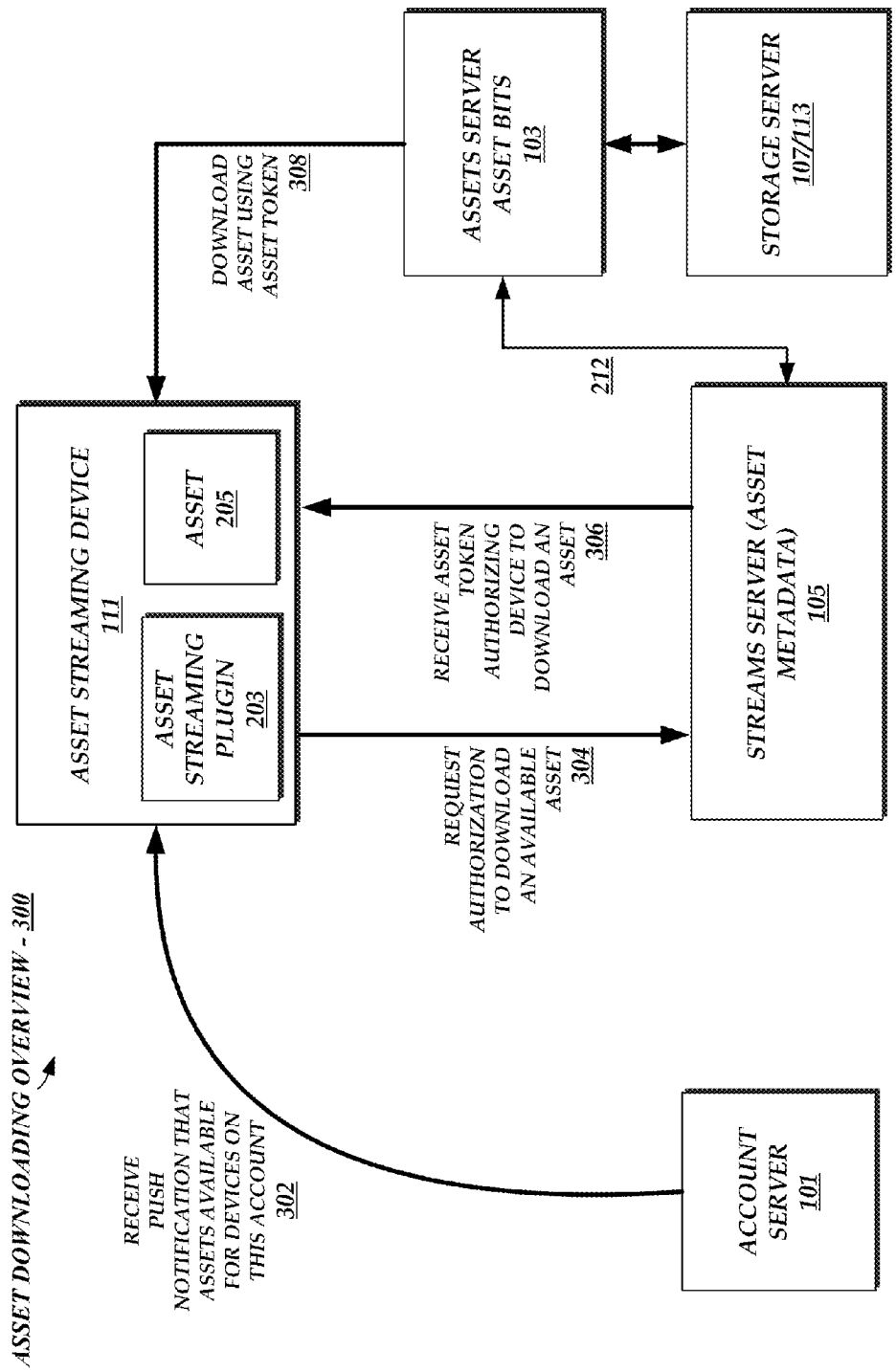
FIG. 3 is a block diagram overview illustrating an exemplary system for asset downloading in accordance with one embodiment of network systems for asset streaming.

FIG. 3 is a block diagram overview illustrating an exemplary system for asset downloading in accordance with one embodiment of network systems for asset streaming. In one embodiment, the account server 101 generates a push notification 302 that causes the other devices associated with the account to "wake up" and request a list of the new streamed assets, e.g., asset 205 that may be available for downloading. In one embodiment, the asset streaming device 111 receives the push notification 302, and sends an asset download authorization request 304 for authorization to download a streamed asset that does not yet reside on the device 111, such as asset 205. The streams server 105 evaluates the asset download authorization request 304 and, if appropriate, authorizes the device 111 to download the asset 205 from network-based cloud storage.

For example, the streams server 105 determines whether the metadata registered for the asset in question is in an "active" state, meaning that the asset is stored and available, or in still in the "pending" states, meaning that the asset hasn't yet been stored and is not available. In some cases the asset 205 may no longer be available due to applicable time limits. In one embodiment, the asset 205 may be maintained for streaming for only a 30-35 day window measured from the date and time the metadata was registered, and the asset 205 was initially uploaded. In one embodiment, the streams server 105 periodically updates/purges the metadata registered for assets in conjunction with the asset server 103 and/or account server 101 as needed.

In another example, the streams server 105 may determine that, in some cases, based on the account associated with the asset in question, devices associated with the account have reached an overall capped amount of asset streaming permitted for that account in a single day. In one embodiment, the capped amount of asset streaming may be governed in a more granular manner by setting account hourly caps as well as daily caps for asset streaming to discourage and prevent excessive streaming use when other methods of transferring assets are more suitable (such as copying large numbers of photos for permanent storage purposes).

In one embodiment, the streams server 105 responding to the asset download authorization request 304 to download an asset provides a change tag or other information that indicates to the assets server 103 how to filter the assets that the device 111 is to receive, such as filtering out those assets that may have already been downloaded to the device 111, or those assets having a certain image resolution or format. For example, the change tag may indicate that the device 111 is to receive only the lower resolution version of an image asset.

In one embodiment, the streams server 105 generates and sends to the device 111 an asset download authorization token 306 that includes the change tag information, and the device 111 receives the asset download authorization token 306. Upon receiving the asset download authorization token 306, the device 111 then downloads 308 the asset 205 from the assets server 103 in accordance with the change tag information. As with the uploading of assets, in one embodiment, the account server 101 has a known address but can point any transactions generated to download the asset 205 to the device 111 using different streams servers 105 and assets servers 103 in remote locations.

Figure 4:
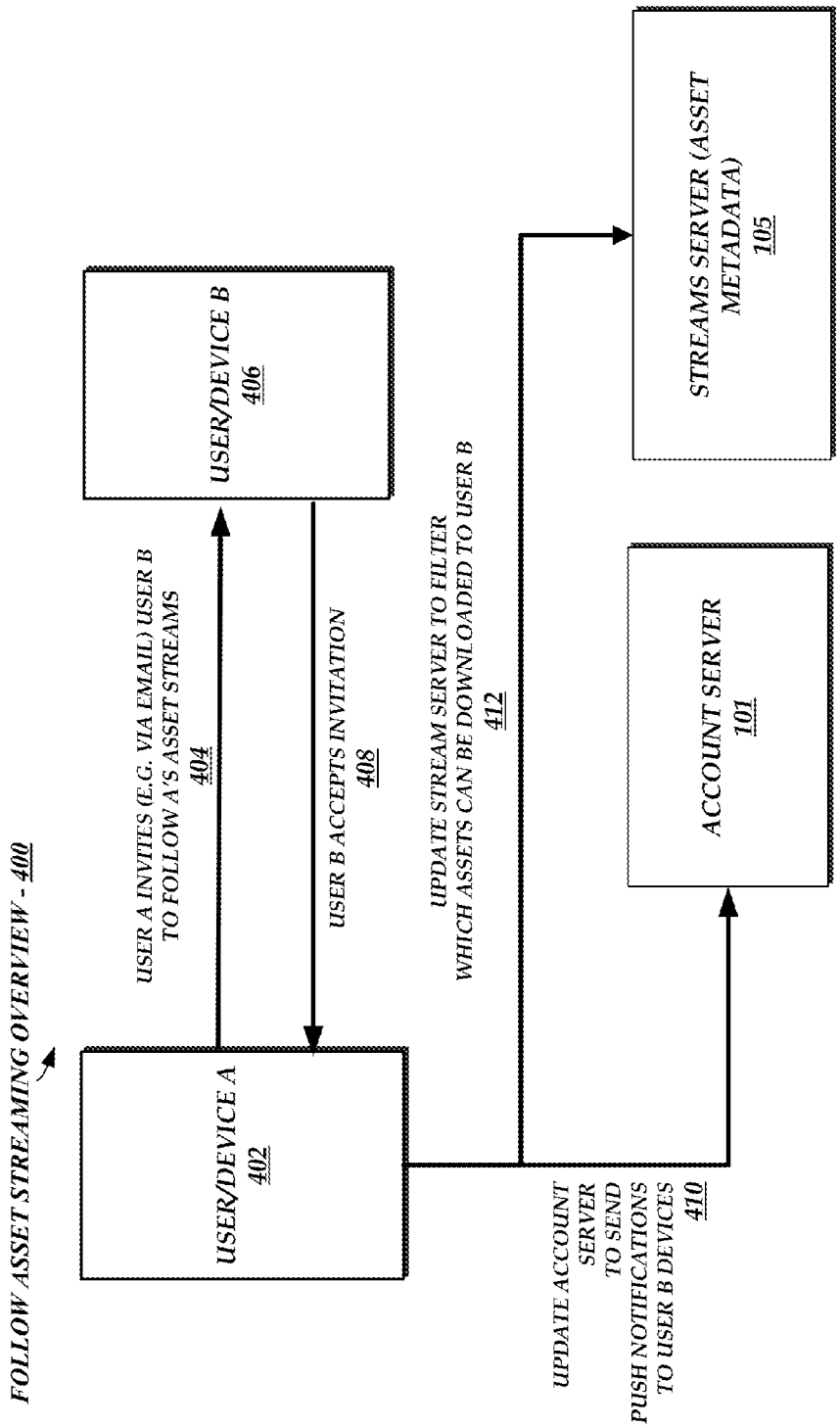
FIG. 4 is a block diagram overview illustrating an exemplary system for asset following in accordance with one embodiment of network systems for asset streaming.
Figure 5:
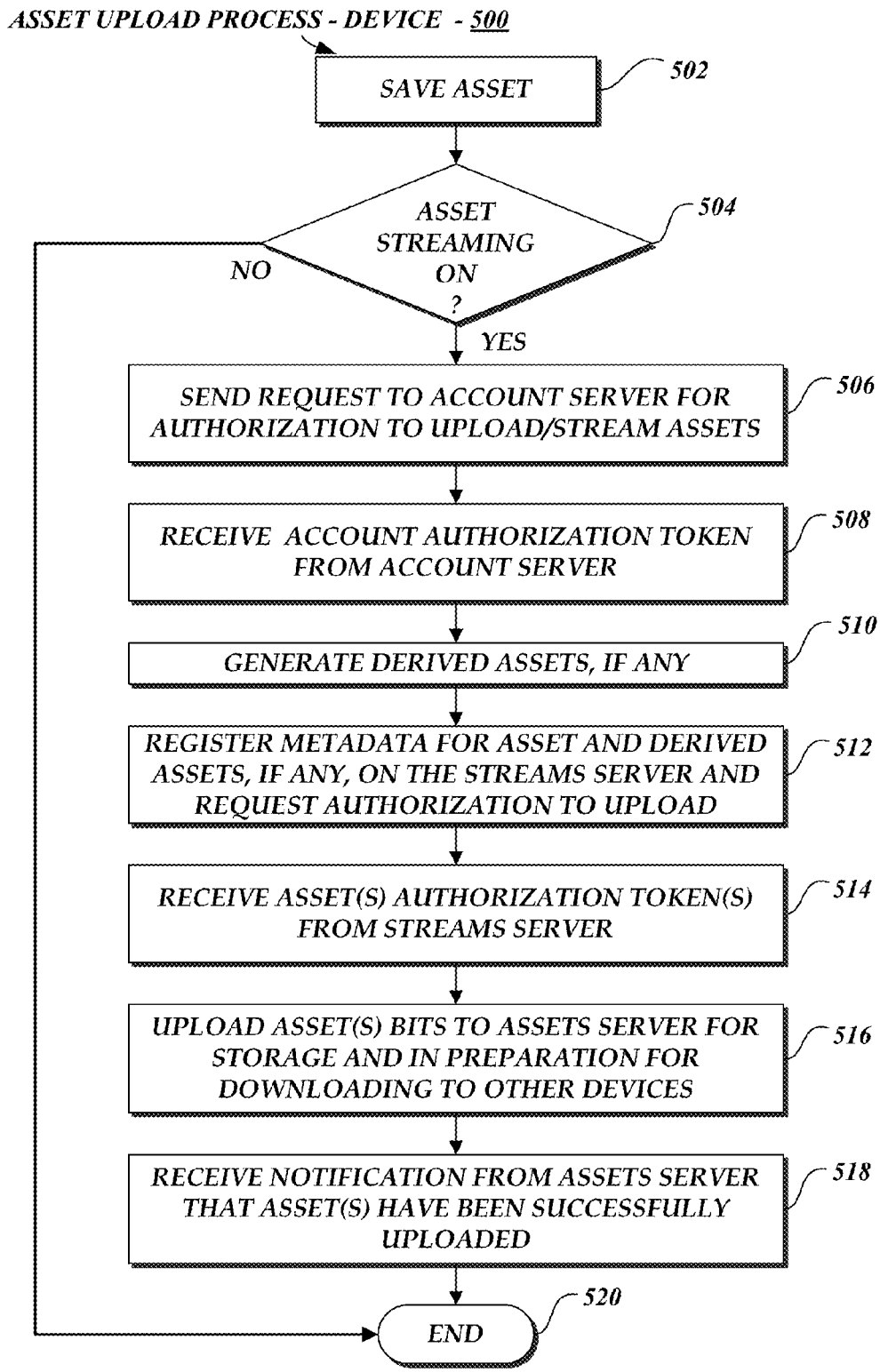
FIGS. 5-8 are flow diagrams illustrating embodiments of a process to upload assets to network-based storage from a device.

FIG. 4 is a block diagram overview illustrating an exemplary system for asset following 400 in accordance with one embodiment of network systems for asset streaming. In one embodiment, a user of a device 111 for which asset streaming is enabled, say device A 402, invites (e.g. via email) 404 another user of a device 111, say device B 406, to follow A's asset streams. Upon receiving the invitation, user B 406 can decide whether to accept the invitation, and if she does, sends an acceptance 408 back to user A 402. The exchange between users is typically brokered by a server (not shown).

In one embodiment, user A 402 relays the acceptance 408 to the account server 101, and requests to update 410 the account server 101 to send push notifications to user B's devices and not just A's devices associated with A's account. In one embodiment, user A can specify with particularity which asset or categories of assets that user A will allow to be downloaded by user B, and requests to update 412 the stream server 105 to filter which assets can be downloaded to user B in accordance with user A's specification. In one embodiment the filter request is typically based on the asset metadata associated with the asset and maintained on the streams server 105 and, in some cases, provided to users in a change tag in a token associated with the asset.

FIGS. 5-8 are flow diagrams illustrating embodiments of a process to upload assets to network-based storage from a device. As illustrated beginning with FIG. 5, during an asset upload process 500 a device 111 saves an asset at process block 502, and the device determines at decision block 504 whether asset streaming is enabled for the device. If not, the process 500 terminates at block 520. Otherwise, process 500 continues, and the device at process block 506 sends a request to the account server for authorization to upload/stream assets. At process 508, the device receives an account authorization token from the account server that authorizes the device to stream assets.

In one embodiment, at process block 510, the device optionally generates derived assets, e.g. assets in different image resolutions (e.g. number of pixels) or using different formatting standards (e.g. RAW, JPEG), that may be streamed. At process block 512, the device sends a request to the streams server to register metadata for the asset (and/or the derived asset) and requests authorization to upload the asset to the network-based storage.

In one embodiment, at process block 514, the device receives one or more asset upload authorization tokens corresponding to the assets that may be uploaded to the cloud. At process block 516, the device uploads the assets to the assets server for storage and in preparation for subsequent downloading to other devices. At process block 518, the device receives a notification form the assets server about whether the assets have been successfully uploaded.

Figure 6:
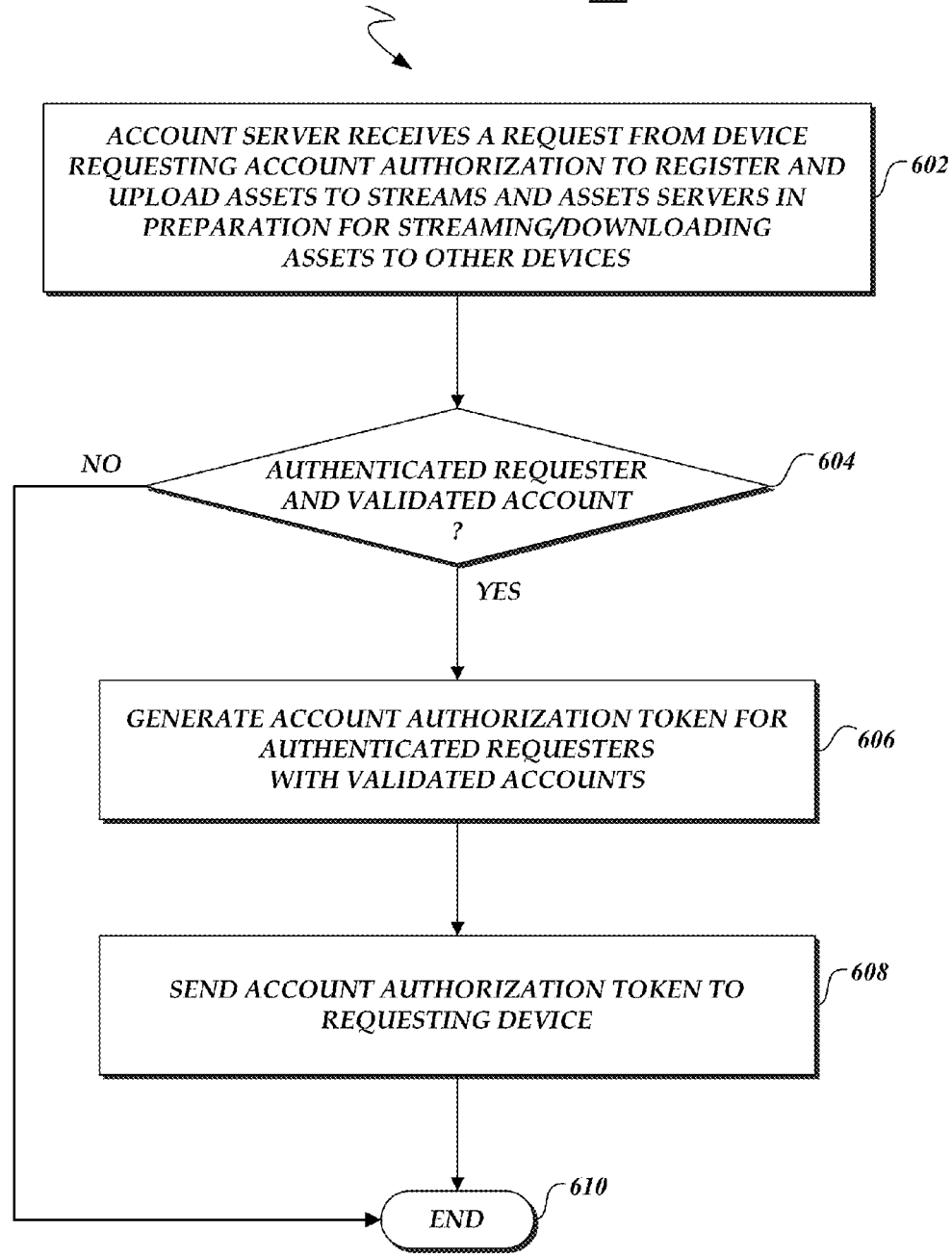

Turning now to FIG. 6, as illustrated, in upload process 600 at process block 602 an account server receives the request from the device requesting the account authorization to register and upload assets to the streams and asset servers in preparation for subsequent downloading to other devices from cloud storage. At decision block 604, the account server evaluates whether the requester can be authenticated and the associated account validated and, if not, the process 600 terminates 610. For authenticated and validated requests, the process 600 continues at process block 606 to generate an account authorization token and at process 608 to send the account authorization token back to the requesting device.

Figure 7:
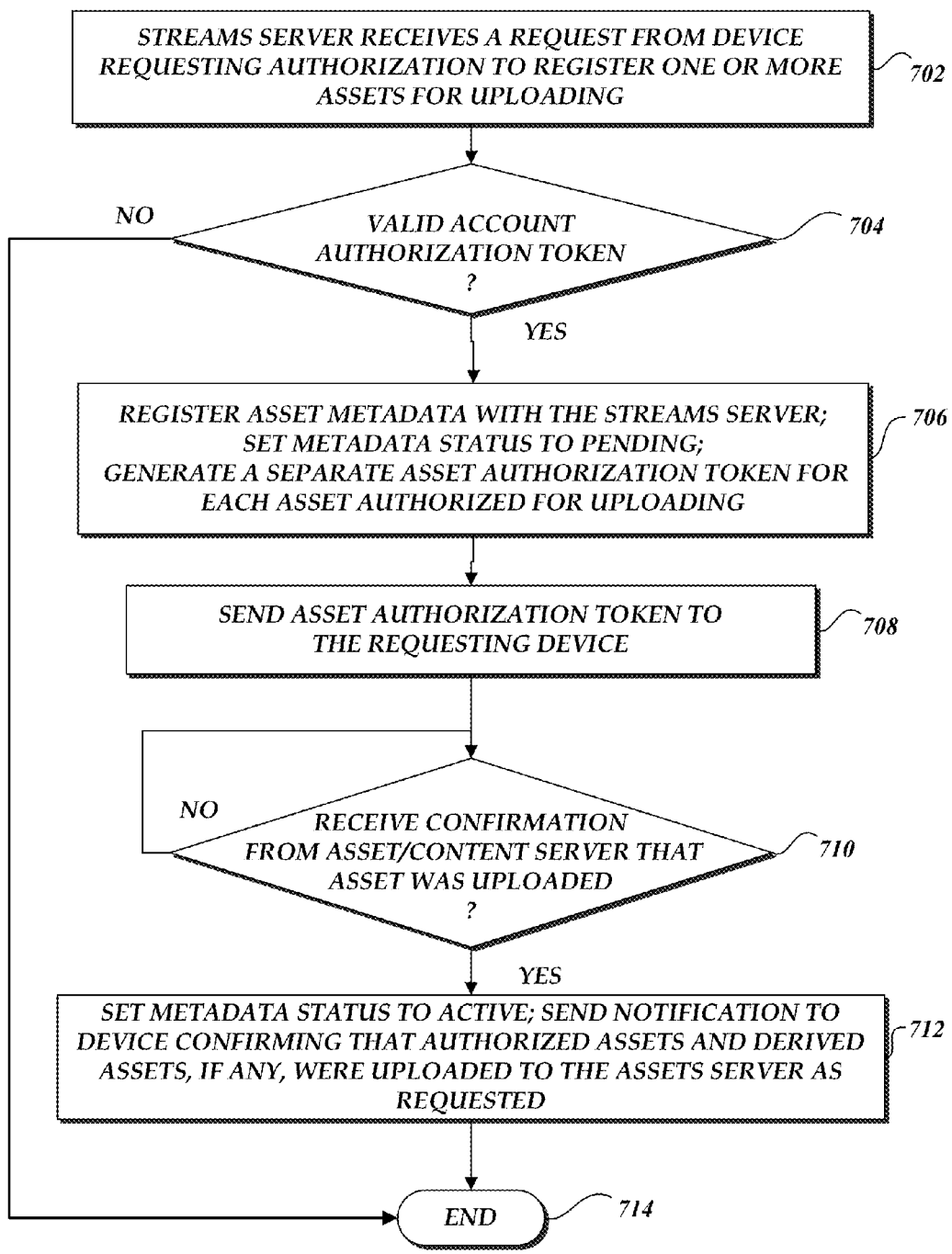

Turning now to FIG. 7, as illustrated, in upload process 700 at process block 702, a streams server receives a request from a device requesting authorization to register one or more assets. At decision block 704, the streams server evaluates whether the requester has obtained a valid account authorization token and, if not, the process 700 terminates 710. For validated requests, the process 700 continues at process block 706 to register asset metadata with the streams server and to generate an asset authorization token for each asset authorized for uploading. At process 708 the streams server sends the asset authorization token back to the requesting device.

In one embodiment, upon sending the asset authorization token back to the requesting device, the process 700 at decision block 710, awaits confirmation from the asset server/storage service, that the asset was, in fact, successfully uploaded. If yes, then the process 700, at process block 712, sets the metadata status to "active," and, in one embodiment, sends a notification to the device confirming that the assets were uploaded as requested.

Figure 8:
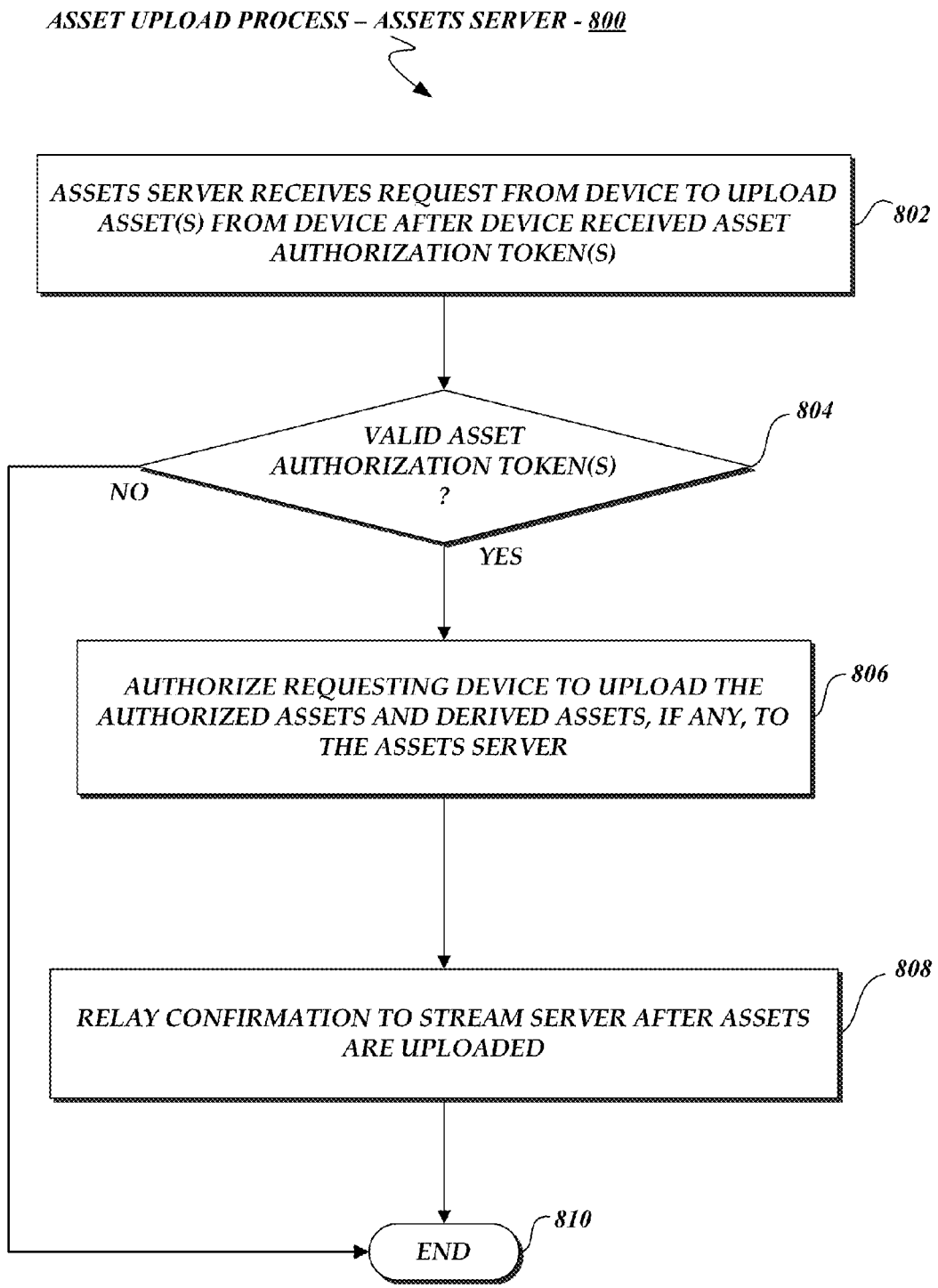
Figure 9:
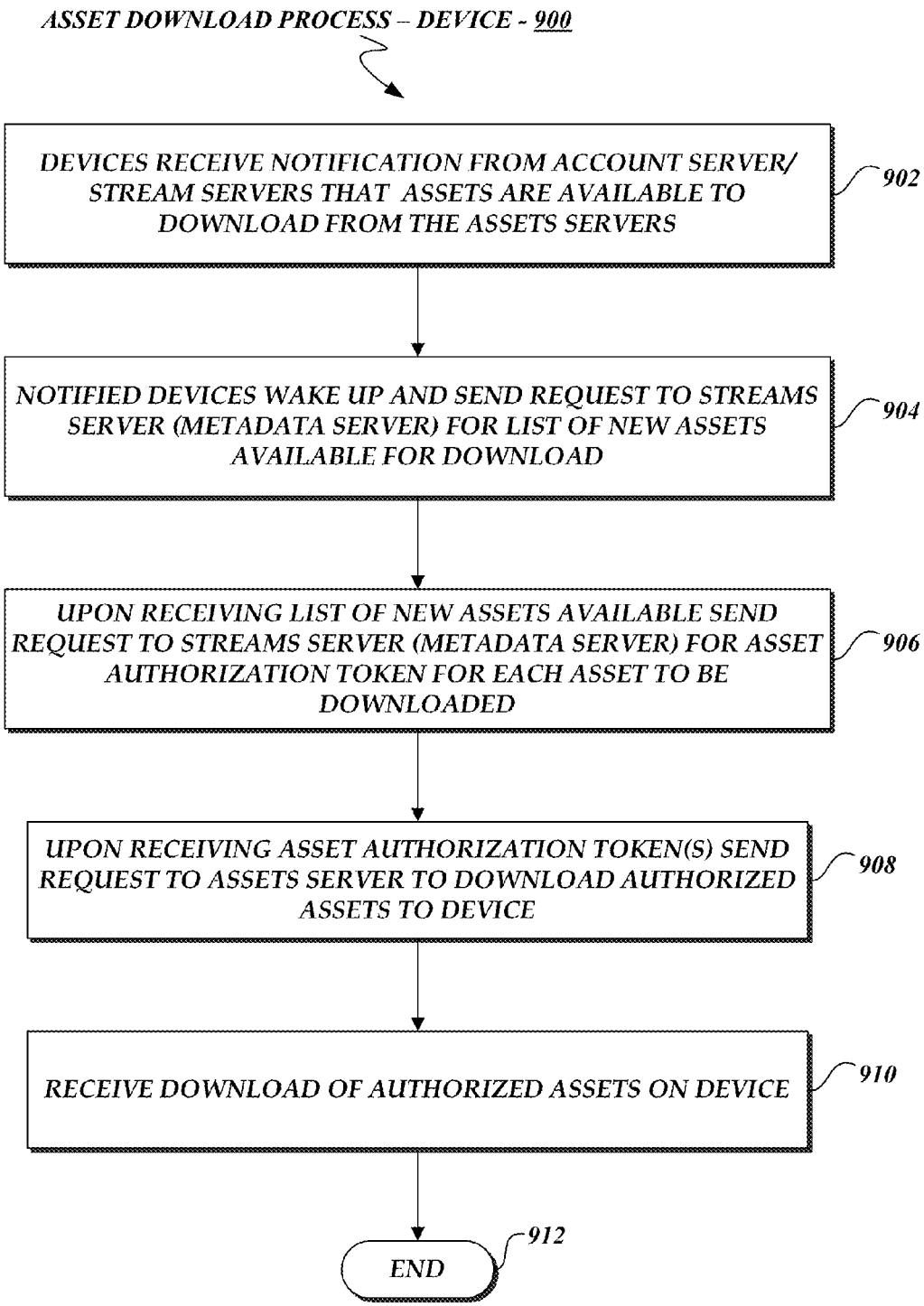
FIGS. 9-12 are flow diagrams illustrating embodiments of a process to download of assets from network-based storage to a device.

Turning now to FIG. 8, as illustrated, in upload process 800 at process block 802, receives an asset upload request from a device to upload assets. At decision block 804, the assets server determines whether the asset upload request is accompanied by a valid asset authorization token and, if not, processing terminates 810. For example, if the asset authorization token has expired, then validation fails. For validated asset upload requests, the process 800 continues at process block 806 in which the assets server uploads from the device the authorized assets, including any derived assets. The process 800 concludes at process block 808 in which the assets server relays confirmation to the streams server that the asset (s) were successfully uploaded to the assets server/cloud storage as requested. In one embodiment, the confirmation may be relayed to the device from which the assets were uploaded directly or via the streams server.

FIGS. 9-12 are flow diagrams illustrating embodiments of a process to download assets from network-based storage to a device. As illustrated, beginning with FIG. 9, during an asset download process 900 a device 111 receives an asset availability notification from an account server that assets are available to download from the assets servers/cloud storage. The process 900 continues at process block 904, in which notified devices wake up and send a new assets list request to the streams server for a list of new assets available to download. In one embodiment, if needed, the notified devices send an account authorization request to the account server as described below with reference to FIG. 10 before sending the new assets list request to the streams server.

In one embodiment, the process 900 continues at process block 906, in which a device, upon receiving the requested list of new assets available, sends an asset download authorization request to the streams server to obtain an asset authorization token for each asset to be downloaded. At process 908, upon receiving the asset authorization token, the device sends an asset download request to the assets server to download authorized assets to the device. In one embodiment, the asset authorization token will include change tag information provided by the streams server, and the change tag information is used to filter which assets the assets server downloads to the device. The process 900 concludes at process block 910, in which the device receives the download of the authorized assets.

Figure 10:
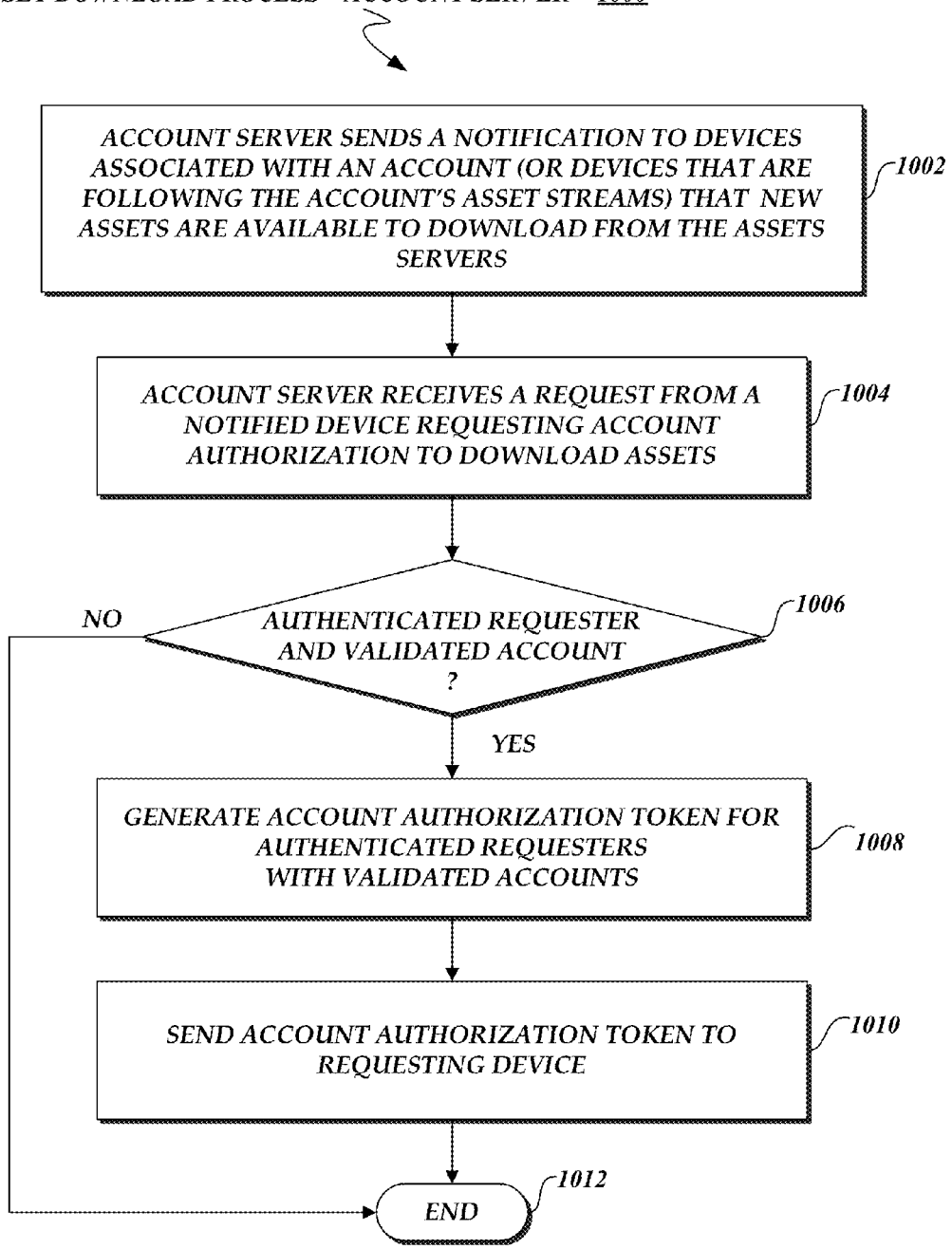

Turning now to FIG. 10, an asset download process 1000 begins with process block 1002, in which an account server sends the aforementioned asset availability notification to devices associated with an account (or to devices that have accepted an invitation to follow or have otherwise subscribed to the account's asset streams), the asset availability notification alerting the devices that assets are available to download from the assets servers. In one embodiment, the process 1000 optionally continues at process block 1004, in which the account server receives an account authorization request from a notified device requesting an account authorization to download assets. At decision block 1006, the account server determines whether the requester is authenticated and the account valid and, if not, terminates 1012. The process 1000 continues at process block 1008, in which the account server generates an account authorization token for authenticated requesters having valid accounts, and at process block 1010, in which the account server sends the account authorization token to the requesting device as needed. In one embodiment, a notified device may already be authenticated at the account level and an account authorization token can be generated without having to re-authenticate the requester and the account, in which case the account authorization token may be transmitted to the device separately or as part of the asset availability notification described with reference to FIG. 9.

Figure 11:
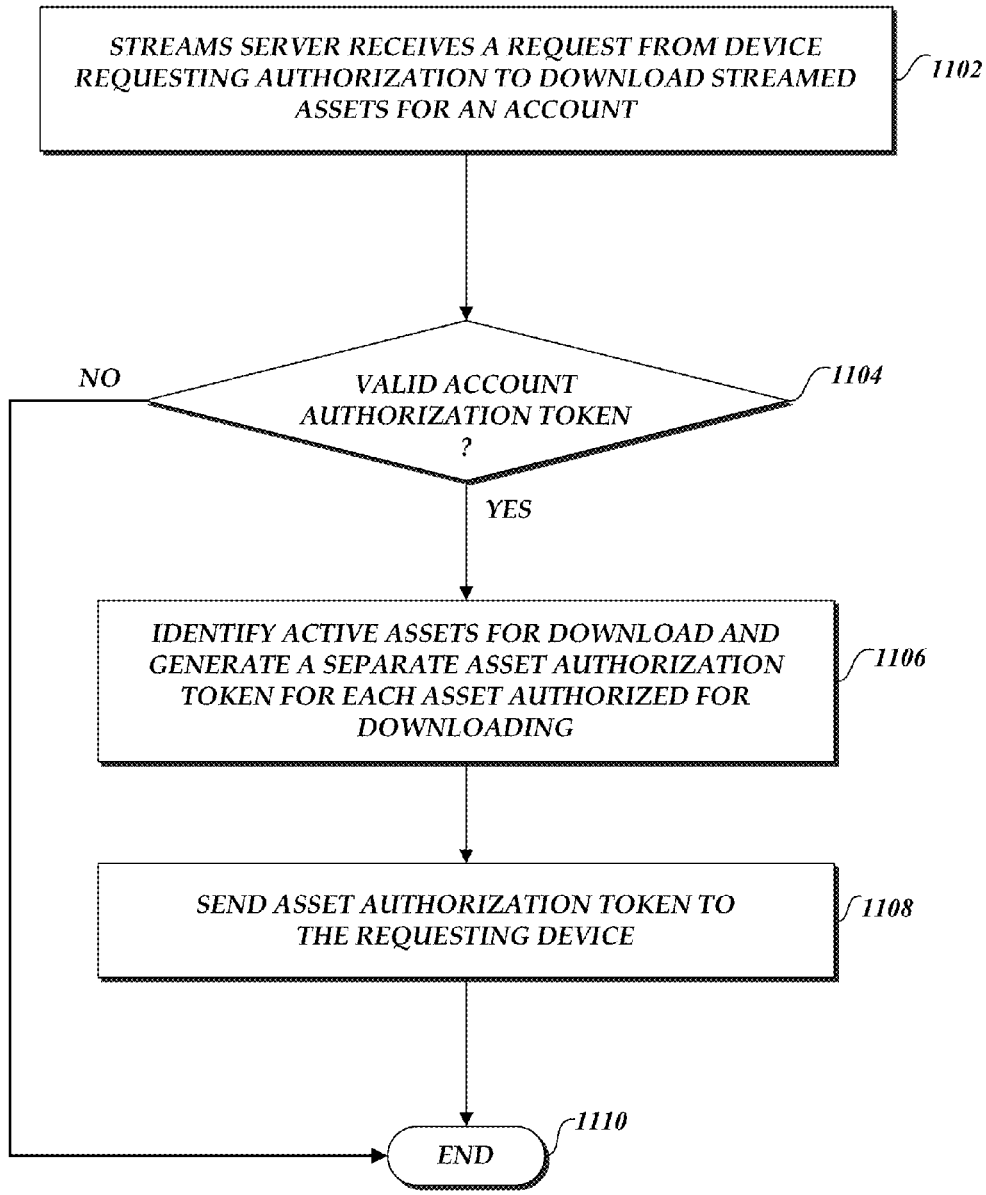

Turning now to FIG. 11, an asset download process 1100 begins at process block 1102, in which a streams server receives an asset authorization request from a device requesting authorization to download streamed assets for an account. At decision block 1104, the process 1100 determines whether the asset authorization request is accompanied by a valid account authorization token and, if not, terminates at 1110. In one embodiment, the streams server, instead of terminating, may initiate an account authorization process on behalf of the requesting device. Once the request is validated, the process 1100 continues at process block 1106, in which the streams server identifies assets for download and generates a separate asset download authorization token for each asset authorized for downloading. In one embodiment, the streams server generates change tag information to include in the asset download authorization token. The process 1100 concludes at process block 1108, in which the streams server sends the asset download authorization token(s) to the requesting device.

Figure 12:
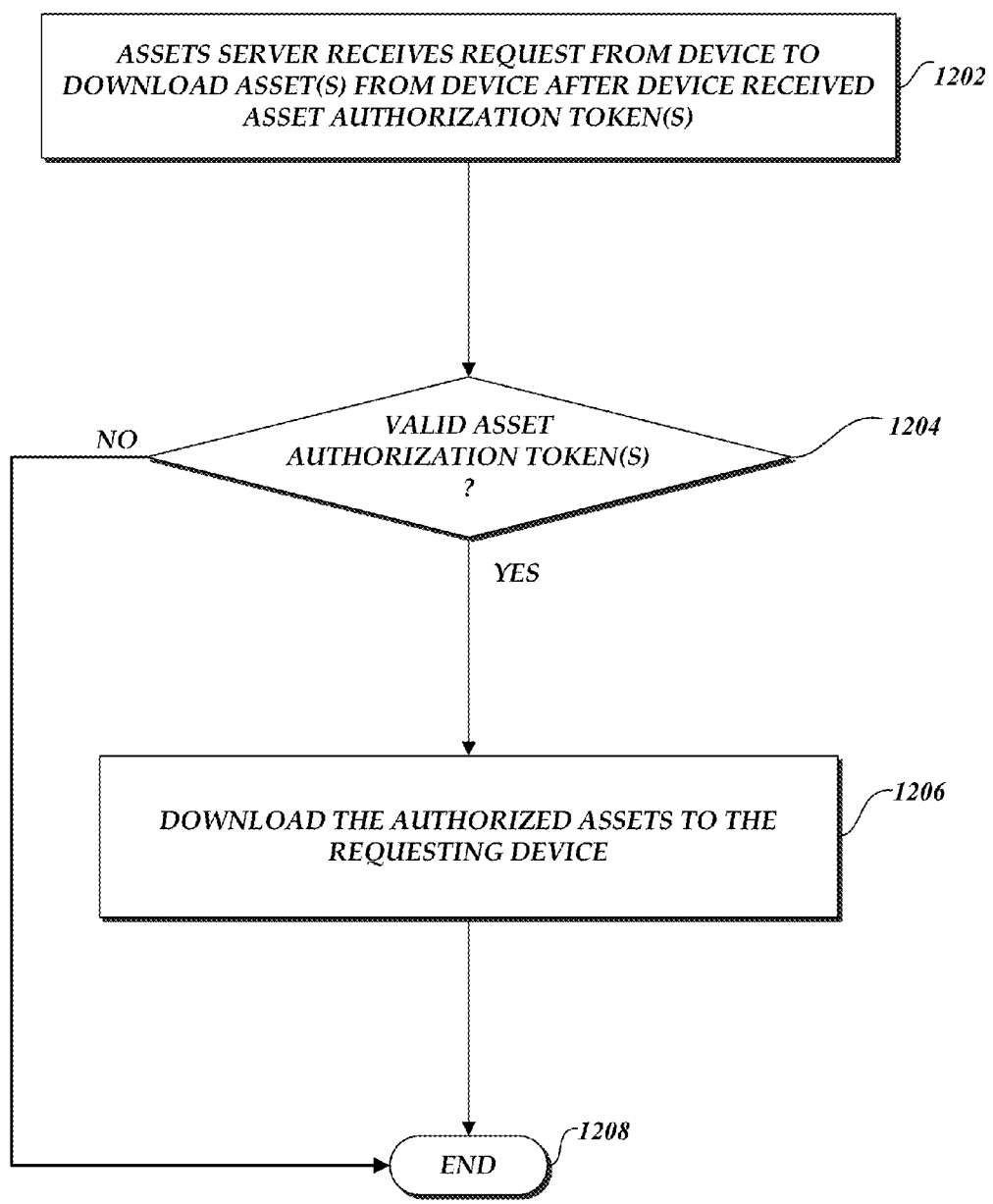

Turning now to FIG. 12, an asset download process 1200 begins at process block 1202, in which an assets server receives an asset download request from a device that has received an asset download authorization token to commence downloading asset(s) to the device. The process 1200 continues at decision block 1204, in which the assets server determines whether the asset download request was accompanied by a valid asset download authorization token and, if not, terminates at 1208. Otherwise, the process 1200 concludes at process block 1206, in which the assets server proceeds to download the authorized asset(s) to the device. In one embodiment, the download of assets is performed in accordance with the change tag information provided by the streams server with the download was authorized.

Figure 13:
FIG. 13-16 are exemplary screen snapshots from a device illustrating embodiments of user interfaces for use in devices supporting asset streaming.

FIGS. 13-16 are exemplary screen snapshots from a device illustrating embodiments of user interfaces for use in devices supporting asset streaming. As illustrated in FIG. 13, in an exemplary user interface 1300 for a mobile communication device, such as the iPhone®, an option for a Photo Stream feature may be selected by a user to turn on asset streaming for photo assets, and displays 1302 an "ON" status accompanied by the message "Photo Stream uploads and stores the last 30 days of your photos on MobileMe® and downloads them to all of your devices. Learn more . . . "

Figure 14:
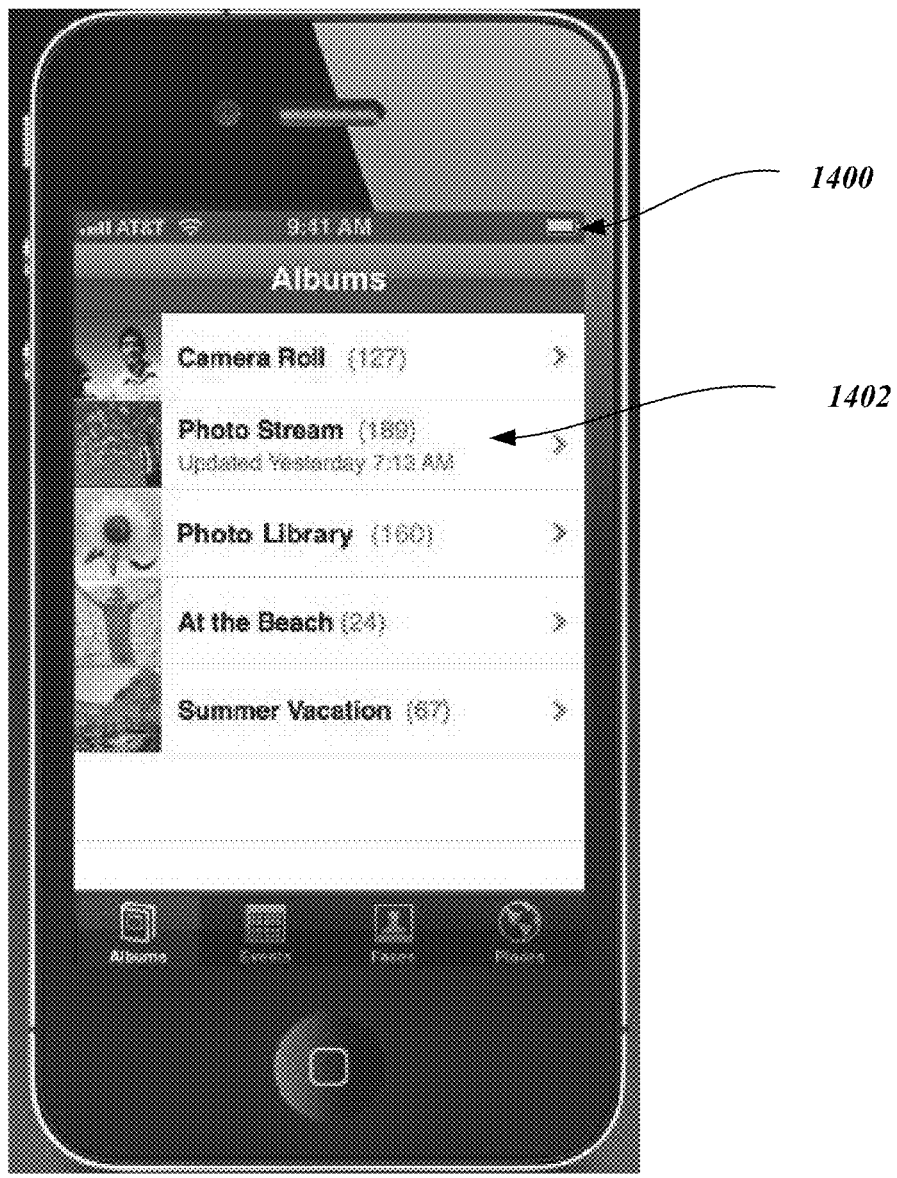

As illustrated in FIG. 14, in an exemplary user interface 1400 for a mobile communication device, such as the iPhone®, an option for a Photo Stream feature may include the automatic generation of a separate album devoted to the assets for Photo Stream, as indicated in the display 1402 under the Albums interface, Photo Stream (189) Updated Yesterday at 7:13 am."

Figure 15:

As illustrated in FIG. 15, in an exemplary user interface 1500 for a mobile communication device, such as the iPhone®, selecting the Albums interface can display the asset images, or streamed photos, along with an informational footer 1502 "Updated Today 2:56 PM"

Figure 16:
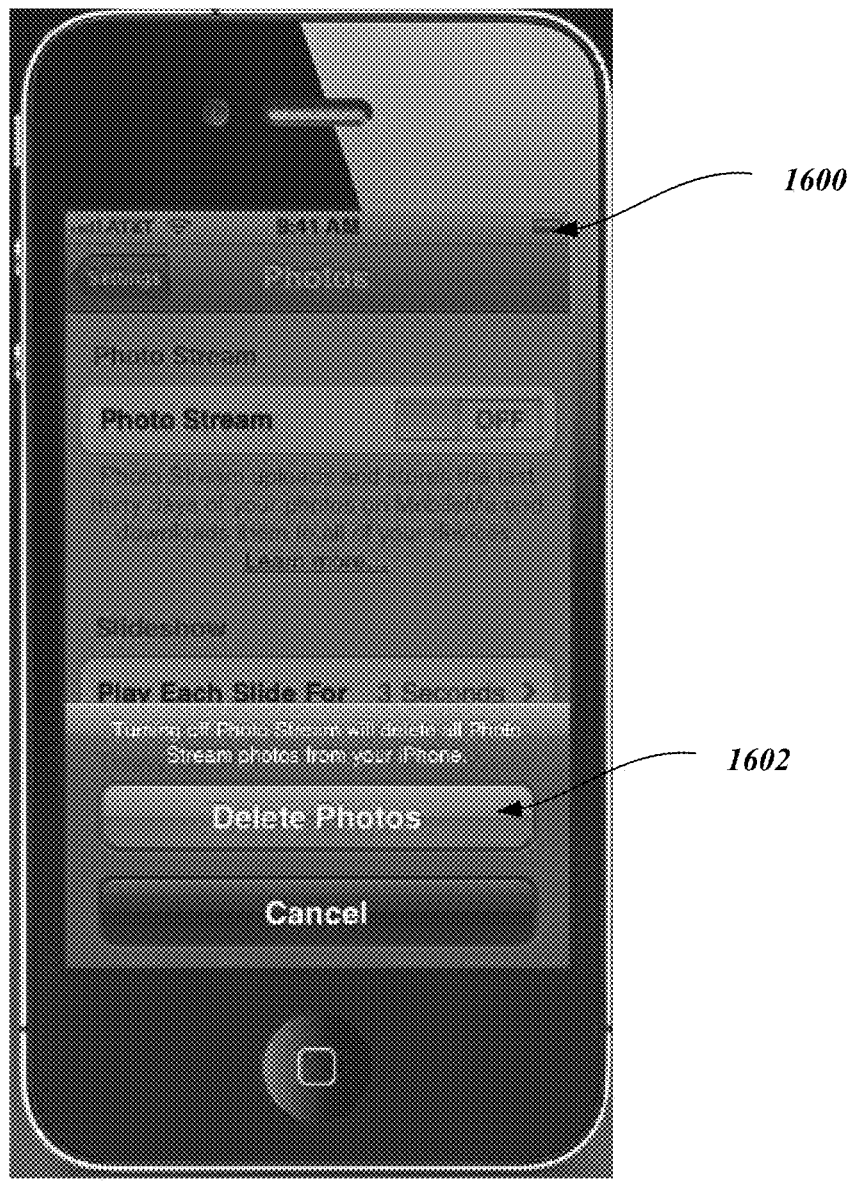

As illustrated in FIG. 16, in an exemplary user interface 1600 for a mobile communication device, such as the iPhone®, an option for a Photo Stream feature may be de-selected by a user to turn off asset streaming for photo assets, and displays 1602 an "OFF" status accompanied by the warning message and button "DELETE PHOTOS, Turning off Photo Stream will delete all Photo Stream photos from your iPhone®," with an option to cancel out of the action.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device.

Figure 17:
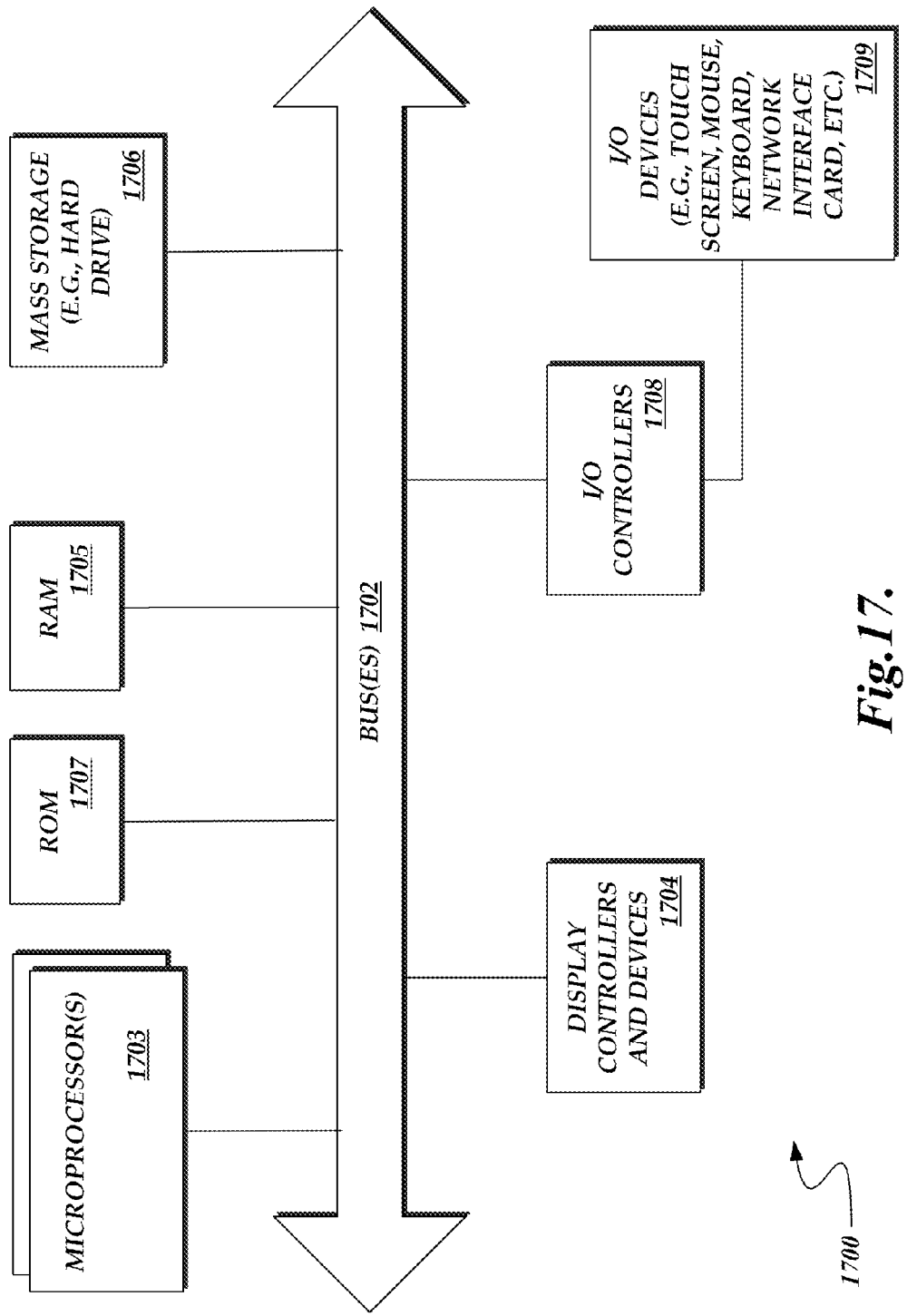
FIG. 17 illustrates an example of a typical computer system which may be used in conjunction with the embodiments described herein.

FIG. 17 shows one example of a typical data processing system which may be used with the present invention. Note that while FIG. 17 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 17 may also be used with the present invention. The data processing system of FIG. 17 may be a Macintosh computer from Apple Inc. of Cupertino, Calif. As shown in FIG. 17, the data processing system 1701 includes one or more buses 1709 which serve to interconnect the various components of the system. One or more processors 1703 are coupled to the one or more buses 1709 as is known in the art. Memory 1705 may be DRAM or non-volatile RAM or may be flash memory or other types of memory. This memory is coupled to the one or more buses 1709 using techniques known in the art. The data processing system 1701 can also include non-volatile memory 1707 which may be a hard disk drive or a flash memory or a magnetic optical drive or magnetic memory or an optical drive or other types of memory systems which maintain data even after power is removed from the system. The non-volatile memory 1707 and the memory 1705 are both coupled to the one or more buses 1709 using known interfaces and connection techniques. A display controller 1711 is coupled to the one or more buses 1709 in order to receive display data to be displayed on a display device 1713 which can display any one of the user interface features or embodiments described herein. The display device 1713 can include an integrated touch input to provide a touch screen. The data processing system 1701 can also include one or more input/output (I/O) controllers 1715 which provide interfaces for one or more I/O devices, such as one or more mice, touch screens, touch pads, joysticks, and other input devices including those known in the art and output devices (e.g. speakers). The input/output devices 1717 are coupled through one or more I/O controllers 1715 as is known in the art. While FIG. 17 shows that the non-volatile memory 1707 and the memory 1705 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 1709 may include one or more bridges or controllers or adapters to interconnect between various buses. In one embodiment, the I/O controller 1715 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 1705 or the non-volatile memory 1707 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented data processing system, the system comprising:
   an account server in intermittent communication with end user devices operable with accounts authenticated by the account server, the account server having a microprocessor configured to associate an authenticated one of the end user devices with other authenticated end user devices, the associated authenticated devices requesting authorization to stream assets among each other using a network-based storage service in accordance with the accounts authenticated by the account server;
   the network-based storage service in communication with the account server and a streams server, the network-based storage service having one or more storage servers, the storage servers and streams server each having a microprocessor configured to interoperate with the account server to restrict streaming assets among the associated authenticated end user devices wherein, for a limited time and in connection with an authenticated account:
      the account server microprocessor is configured to authorize an originating authenticated end user device to use the network-based storage service to stream an asset acquired by the originating authenticated end user device back to the originating authenticated end user device and to any of the associated authenticated end user devices with which the originating authenticated end user device is associated;
      the streams server microprocessor is configured to register metadata describing the asset and further authorize the originating authenticated end user device to upload the asset to a storage server; and
      the storage server microprocessor is configured to store the asset and receive the asset uploaded from the originating authenticated end user device in accordance with the metadata registered for the asset.

2. A computer-implemented data processing system as in claim 1, wherein the streams server microprocessor is further configured to authorize the originating authenticated end user device and any of the associated authenticated devices to download the asset from the storage server in accordance with the metadata registered for the asset.

3. A computer-implemented data processing system as in claim 1, wherein the account server, storage server and streams server that restrict streaming assets are further configured to notify the originating authenticated end user device and any of the associated authenticated devices that the asset is available for streaming in accordance with the metadata registered for the asset.

4. A computer-implemented data processing system as in claim 1, wherein the associated authenticated devices include devices that are:
   authorized to stream assets in connection with a same authenticated account as the originating authenticated end user device that acquired the asset; and
   authorized to follow assets streamed by the originating authenticated end user device that acquired the asset in accordance with the metadata registered for the asset.

5. A computer-implemented data processing system as in claim 1, wherein the account server microprocessor is further configured to indicate which server of the network-based storage service that the authenticated end user device with which the account server is communicating should use to stream assets based on a proximity of the originating authenticated end user device or the associated authenticated end user devices for which the assets are being streamed to any one or more of available servers of the network-based storage service.

6. A computer-implemented method of streaming assets among end user devices in communication with a network-based storage system, the method comprising:
   performing in an account server, the account server in communication with the end user devices and the network-based storage system:
   authenticating the end user devices as operable with an authenticated account;
   associating one of the authenticated end user devices with other authenticated end user devices;
   responding to requests received from the network-based storage service for authorization for an authenticated end user device to stream an asset using the network-based storage system, the asset having been acquired by the authenticated end user device, wherein responding to requests includes:
   facilitating metadata registration in the network-based storage service, the metadata describing the asset, the metadata including information obtained from the authenticated account in connection with which authorization to stream the asset was requested; and
   granting requests for authorization wherein authorization to stream the asset is restricted to a limited time in connection with the authenticated account, and is limited to the authenticated end user device and associated authenticated end user devices.

7. A computer-implemented method as in claim 6, wherein the requests received from the network-based storage service for authorization for the authenticated end user device to stream the asset acquired by the authenticated end user device includes requests to authorize downloading the asset from the network-based storage service to the authenticated end user devices in accordance with the metadata registered for the asset.

8. A computer-implemented method as in claim 6, further comprising:
   performing in the account server responsive to requests from the network-based storage service:
   notifying the authenticated end user device and any of the associated authenticated end user devices that the asset is available for streaming restricted for the limited time in connection with the authenticated account, and in accordance with the metadata registered for the asset, wherein notifying includes:
      determining which authenticated end user device and associated authenticated end user devices are to be notified; and
      authenticating the accounts with which the determined authenticated and associated authenticated end user devices are operable.

9. A computer-implemented method as in claim 6, wherein the associated authenticated end user devices, if any, with which the authenticated end user device is associated include authenticated end user devices that are:
   authorized to stream assets in connection with a same authenticated account as the authenticated end user device that acquired the asset; and
   authorized to follow assets streamed by the authenticated end user device that acquired the asset in accordance with the metadata registered for the asset.

10. A computer-implemented method as in claim 6, wherein responding to requests received from the network-based storage service further includes the account server notifying the authenticated and associated authenticated end user devices for which the requests were received which server of the network-based storage service should be used to stream assets based on a proximity of the authenticated and associated authenticated end user devices among which the assets are being streamed to any one or more of available servers of the network-based storage service.

11. A machine readable, non-transitory, tangible storage medium storing executable instructions which cause a data processing system to perform a method for streaming assets among end user devices in communication with a network-based storage system, the method comprising:
   responding to requests received from the end user devices in communication with the network-based storage service, the end user devices requesting authorization to stream an asset using the network-based storage service, the asset having been acquired by an end user device, wherein responding to requests includes:
      authenticating the end user devices as operable with an authenticated account;
      associating one of the authenticated end user devices with other authenticated end user devices;
      facilitating metadata registration in the network-based storage service, the metadata describing the asset, the metadata including information obtained from the authenticated account in connection with which authorization to stream the asset was requested; and
      granting requests for authorization wherein authorization to stream the asset is restricted to a limited time in connection with the authenticated account, and is limited to the authenticated end user device and associated authenticated end user devices.

12. A machine readable, non-transitory, tangible storage medium as in claim 11, wherein the requests received from the network-based storage service for authorization for the authenticated end user device to stream the asset acquired by the authenticated device includes requests to authorize downloading the asset from the network-based storage service to the authenticated end user devices in accordance with the metadata registered for the asset.

13. A machine readable, non-transitory, tangible storage medium as in claim 11, wherein the method being performed is further comprising:
   notifying the authenticated end user device and any of the associated authenticated end user devices that the asset is available for streaming restricted for the limited time in connection with the authenticated account, and in accordance with the metadata registered for the asset, wherein notifying includes:
      determining which authenticated end user device and associated authenticated end user devices are to be notified; and
      authenticating the accounts with which the determined authenticated and associated authenticated end user devices are operable.

14. A machine readable, non-transitory, tangible storage medium as in claim 11, wherein the associated authenticated end user devices, if any, with which the authenticated end user device is associated include authenticated end user devices that are:
   authorized to stream assets in connection with a same authenticated account as the authenticated end user device that acquired the asset; and
   authorized to follow assets streamed by the authenticated end user device that acquired the asset in accordance with the metadata registered for the asset.

15. A machine readable, non-transitory, tangible storage medium as in claim 11, wherein responding to requests received from the network-based storage service further includes notifying the authenticated and associated authenticated end user devices for which the requests were received which server of the network-based storage service should be used to stream assets based on a proximity of the authenticated and associated authenticated end user devices among which the assets are being streamed to any one or more of available servers of the network-based storage service.

* * * * *